United States Patent Office 3,186,827
Patented June 1, 1965

3,186,827
MANUFACTURE OF GRANULAR FERTILIZERS
Isaac Allan Brownlie and George Andrew Wemyss, Edinburgh, Scotland, assignors to Scottish Agricultural Industries Limited, Edinburgh, Scotland, a corporation of Great Britain
No Drawing. Filed Aug. 16, 1962, Ser. No. 217,264
Claims priority, application Great Britain, Sept. 8, 1961, 32,398/61; June 19, 1962, 23,521/62
2 Claims. (Cl. 71—34)

The present invention relates to an improved process of manufacturing granular mixed fertilizers, in particular to an improved process of manufacturing fertilizers containing ammonium phosphates, and to granular fertilizers produced thereby.

The agronomic value of a fertilizer depends upon the amount of plant nutrients, particularly nitrogen, phosphorus and potassium, which it contains. The plant food content of a mixed fertilizer is represented by a set of three figures which refers to the percentages (by weight) of $N:P_2O_5:K_2O$ respectively in the fertilizer. The phosphate content is commonly supplied by introducing one or more of the following substances into the fertilizers: single superphosphate (18–21% $P_2O_5$), triple superphosphate (45–50% $P_2O_5$) and ammonium phosphates such as mono-ammonium phosphate, $NH_4H_2PO_4$, and di-ammonium phosphate, $(NH_4)_2HPO_4$. An ammonium phosphate is characterized by its N:P atomic ratio; thus mono-ammonium phosphate has an N:P atomic ratio of 1.0 while an equimolar mixture of mono-ammonium phosphate and di-ammonium phosphate has an N:P atomic ratio of 1.5.

In order to manufacture high analysis (percent N+percent $P_2O_5$+percent $K_2O>30\%$) mixed fertilizers, it is sometimes not convenient and practicable to use superphosphates as the sole source of $P_2O_5$ and ammonium phosphates are therefore used to supply part or all of the $P_2O_5$. However, superphosphates have a beneficial effect upon the granulation of fertilizer compositions and the more superphosphate which such a composition contains, in general the easier it is to granulate that composition. The granulation of fertilizer compositions in which the $P_2O_5$ content originates exclusively from ammonium phosphates is relatively difficult by most conventional methods which do not rely on a high recycle of dried product to the granulation stage. Therefore past practice has usually been to incorporate as much superphosphate in granular fertilizers as it is possible whilst maintaining a high analysis for the fertilizers.

We have now found that solid ammonium phosphates can be made to behave similarly to superphosphate in granulation of mixed fertilizer compositions if they contain a substantial portion of the water required to effect granulation of these compositions, hence it is possible to manufacture granular mixed fertilizers using a solid ammonium phosphate ingredient instead of superphosphate by conventional low recycle techniques, and to achieve a high degree of homogeneity in the product.

According to the present invention the process for the production of a granular mixed fertilizer in which a solid ingredient comprising ammonium phosphate of N:P atomic ratio in the range 0.95 to 1.6 is mixed with other fertilizer ingredients and subjected to wet granulation is characterized in that said solid ingredient has a moisture content, prior to its admixture with the other ingredients, of at least 15% of that required for the wet granulation and contributes at least 5% $P_2O_5$ on the total weight of the mixed fertilizer.

Below an N:P atomic ratio of around 0.95 ammonium phosphate becomes decidedly acid, corrosive and hygroscopic owing to the presence of free phosphoric acid.

Above an N:P atomic ratio of around 1.6 the equilibrium ammonia vapour pressure of ammonium phosphate increases rapidly giving rise to difficulties in utilization in the manufacture of granular mixed fertilizers. It has been found that said solid ingredient has to contribute at least 15% of the moisture required for the wet granulation and at least 5% $P_2O_5$ on the total weight of the mixed fertilizer to have a practical and significant effect on the granulation.

If the said solid ingredient consists substantially of ammonium phosphate and is made from phosphoric acid prepared by a "wet-process" its moisture content should be in the range of 3.5% to 15%. The desirable moisture content range depends upon the N:P atomic ratio of the ammonium phosphate ingredient and the source of phosphate rock used to prepare the wet-process phosphoric acid.

In the method of the invention the ingredient comprising ammonium phosphate is a solid which when subjected to a granulation operation tends to become fluid and hence to act as the agglomerating medium.

The N:P atomic ratio of a composition containing nitrogen or phosphorus compounds in addition to ammonium phosphate is the N:P atomic ratio of only the ammonium phosphate component.

When, in an embodiment of the invention, highly water-soluble materials such as ammonium nitrate or urea are added separately from the ammonium phosphate ingredient, over-granulation difficulties associated with conventional wet granulation methods are largely overcome since a substantial proportion of the moisture required for granulation is already associated as a salt solution within the solid ammonium phosphate ingredient before admixture rather than added after admixture with these highly soluble materials. However, should it be desirable to incorporate at least one other ammonium salt, as, for example, ammonium nitrate or ammonium sulphate and/or urea, these are preferably included in the solid ingredient comprising ammonium phosphate. Such additives change the solubility characteristics of said solid ingredient and hence the desired moisture range is altered. As in conventional wet-granulation procedure a proportion of dried end product may be recycled to the wet-granulation stage.

The preferred moisture content ranges for solid ingredients comprising ammonium phosphate derived from Nauru rock are given in the table below. By the $N:P_2O_5$ weight ratio of a solid ingredient comprising ammonium phosphate is meant the ratio of the total weights of N and $P_2O_5$ contained in said ingredient in any chemical form.

SOLID INGREDIENT COMPRISING AMMONIUM PHOSPHATE

| N:P atomic ratio of ammonium phosphate | Other component | $N:P_2O_5$ weight ratio | Preferred moisture range, percent |
|---|---|---|---|
| 0.95 | | ~1:4 | 6–12 |
| 1.3–1.6 | | 1:3.5–1:2.8 | 3.5–9 |
| 1.0 | Ammonium sulphate | 1:2 | 5–10 |
| 1.0 | do | 1:1 | 4–9 |
| 1.0 | do | 2:1 | 3–8 |
| 1.6 | do | 1:2 | 4–9 |
| 1.6 | do | 1:1 | 4–8 |
| 1.6 | do | 2:1 | 3–7 |
| 1.0 | Ammonium nitrate | 1:2 | 4–8 |
| 1.0 | do | 1:1 | 4–8 |
| 1.0 | do | 2:1 | 2.5–7 |
| 1.6 | do | 1:2 | 3–7 |
| 1.6 | do | 1:1 | 3–7 |
| 1.6 | do | 2:1 | 2.5–6 |
| 1.0 | Urea | 1:2 | 3–5 |
| 1.0 | do | 1:1 | 2–4 |
| 1.6 | do | 1:2 | 2–4 |

The solid ingredients of $N:P_2O_5$ weight ratio 1:2, 1:1 and 2:1 exemplified above can be successfully used in the process of the invention for instance to produce compound fertilizers of $N:P_2O_5:K_2O$ ratio 1:2:1, 1:1:1, 1:1:1½ and 2:1:1 with a potassium-bearing material such as muriate of potash.

If a solid ammonium phosphate ingredient of moisture content lower than the stated range is used, it is difficult to achieve good granulation even with the addition of extra moisture. At moisture contents of the solid ammonium phosphate ingredient above the stated range, granulation is impaired by the formation of oversize.

If it is desired to manufacture a granular mixed fertilizer containing ammonium phosphate of N:P atomic ratio higher than that of the solid ammonium phosphate ingredient, ammoniation may be effected at the stage in which said solid ammonium phosphate is mixed with the other fertilizer ingredients and subjected to wet-granulation.

In our co-pending British applications Nos. 32,399/61 and 23,522/62 (U.S. Serial No. 217,539) there is claimed a process of manufacture of solid ingredients comprising ammonium phosphate particularly suited for the process of the present invention. Such solid ingredients are registered under the trademark "PhoSAI."

The process of the invention is illustrated in the following examples.

Example I

A 13.5:13.5:13.5 granular mixed fertilizer is made at a net rate of 4 tons/hour in a conventional pan-type granulation plant. The raw materials comprise normal commercial grades of muriate of potash and sulphate of ammonia and a solid ammonium phosphate of composition 10.9% N, 50.8% $P_2O_5$, 9.6% $H_2O$ and N:P atomic ratio 0.95. Up to 3.2 tons/hour of dried product is recycled to the granulation stage.

Batches of raw materials together with recycled product at 66° C. are steam-granulated for 7½ minutes giving a drier-feed of moisture content 7.7% and temperature 60° C. Thus 18–33% of the water required for granulation is contained in the solid ammonium phosphate ingredient. The co-current drier of the said granulation plant has an inlet gas temperature of 399° C., and an exit gas temperature of 113° C. The fertilizer product, of which up to 75% is in the size range 5 to 16 B.S. sieve, comes from the drier at 116° C. and has a moisture content of 0.1 to 0.6%. All parts are parts by weight.

Example II

A 14:28:14 granular mixed fertilizer is produced as follows: 10 parts (dry weight) of solid ingredient consisting of ammonium nitrate and mono-ammonium phosphate and of analysis 18% $P_2O_5$, 36% N (dry weight) at various moisture levels to give at least 15% of that required for the wet-granulation operation and 3 parts muriate of potash (60% $K_2O$) are pre-mixed and introduced to a rotary drum granulator along with 13 parts of recycled fines and crushed oversize. By application of heat to the outside of the drum a temperature of 60° C. is maintained in the rolling bed of granulating material. Most satisfactory granulation occurs with solid ammonium phosphate ingredients containing 4–8% $H_2O$, with the introduction of a small amount of water as a spray to the rolling bed, to give a drier inlet feed containing 2.5–3% $H_2O$. The proportion of the moisture required for granulation introduced in the solid ammonium phosphate ingredient under such conditions is from 50–80%. Above a moisture content of about 8% in said solid ammonium phosphate ingredient over-granulation occurs. Best control is achieved with a moisture content in said ingredient of 4–6% $H_2O$, the remaining required moisture being sprayed on to the rolling bed.

The granules from the drum granulator are dried to a moisture content of 0.3% $H_2O$ in a co-current rotary drier in which the maximum solids temperature is approximately 100° C.

Example III

A 19:19:19 granular fertilizer is made by a technique similar to that of Example II. 10 parts (dry weight) of solid ingredient consisting of urea and mono-ammonium phosphate and of analysis 28% $P_2O_5$, 28% N (dry weight) at various moisture levels to give at least 15% of that required for the wet-granulation operation is premixed with 4.7 parts muriate of potash and granulated with variable addition of water with 14.7 parts recycled fines and cracked oversize in a rotary granulator at 60° C. Most successful granulation is achieved with 2–4% $H_2O$ in said solid ammonium phosphate ingredient and a drier inlet feed containing 2.0 to 2.8% $H_2O$. The proportion of the moisture required for granulation introduced in said ingredient is thus from 24 to 68%. Drying of the granules to a moisture content of 0.5% $H_2O$ is achieved in a co-current rotary drier in which the maximum solids temperature is approximately 70° C.

What we claim is:

1. A process for the production of granular mixed fertilizer comprising mixing solid ammonium phosphate having an N:P atomic ratio of from 0.95 to 1.6 and a moisture content of up to 15%, with other conventional fertilizer ingredients, and thereafter subjecting said mixture to wet granulation, said ammonium phosphate contributing at least 5% $P_2O_5$ to the end product and providing at least 15% of the moisture for the wet granulation thereby serving as the granulating agent.

2. A process as claimed in claim 1 wherein said ammonium phosphate is made from phosphoric acid prepared by a wet process, and has a moisture content of from 3.5 to 15%.

References Cited by the Examiner
UNITED STATES PATENTS

| | | | |
|---|---|---|---|
| 2,136,793 | 11/38 | Gabeler | 71—40 |
| 2,287,759 | 6/42 | Hardesty et al. | 71—64 |
| 2,703,276 | 3/55 | Hedrick et al. | 71—64 |
| 2,857,262 | 10/58 | Graham | 71—64 |
| 2,957,763 | 10/60 | Barnes et al. | 71—64 |
| 2,963,359 | 12/60 | Moore et al. | 71—64 |
| 3,005,696 | 10/61 | Hignett et al. | 71—64 |
| 3,037,855 | 6/62 | Smith | 71—64 |

DONALL H. SYLVESTER, *Primary Examiner.*
ANTHONY SCIAMANNA, *Examiner.*